Nov. 18, 1969         A. W. RICHARDSON         3,478,588
                       CARDIAC OUTPUT METER
                        Filed July 17, 1967
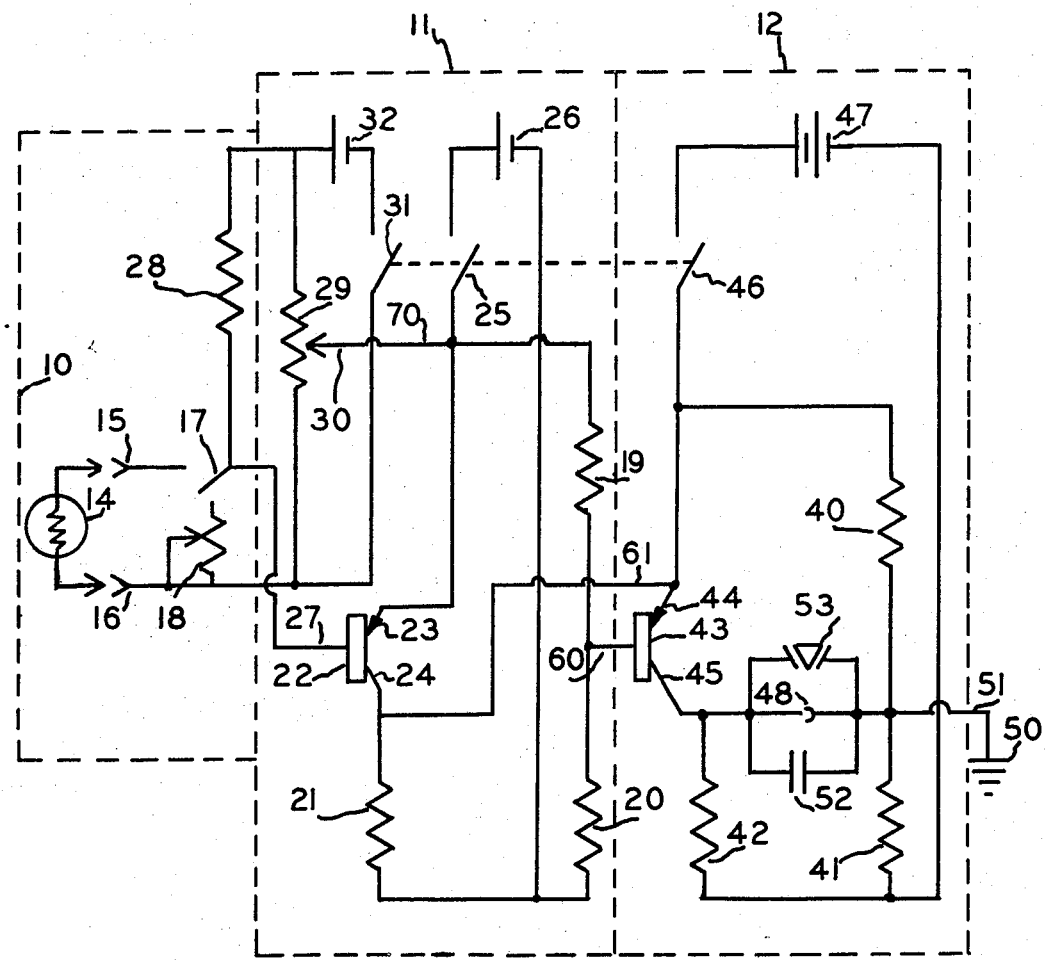
INVENTOR
ALFRED W. RICHARDSON
BY
*Richard J. Miller*
ATTORNEY

United States Patent Office 3,478,588
Patented Nov. 18, 1969

3,478,588
CARDIAC OUTPUT METER
Alfred W. Richardson, Carbondale, Ill., assignor, by mesne assignments, to the United States of America as represented by the Secretary of the Navy
Filed July 17, 1967, Ser. No. 654,016
Int. Cl. G01k 5/18, 5/52, 5/72
U.S. Cl. 73—362       8 Claims

ABSTRACT OF THE DISCLOSURE

A double bridge system using a circuit having a pair of transistors and having a single variable resistance as a balance control to adjust the entire output to null; the circuit includes a thermistor as a sensing device to obtain a very sensitive temperature measuring instrument.

---

This invention relates to an improved double bridge circuit and more specifically to an electronic circuit designed for the measurement of small temperature changes.

In essence, it consists of a unique double bridge circuit utilizing the negative resistance characteristics of transistors in individual legs of the bridge circuit for amplifying signals.

Continued advances are being made in the field of medical knowledge. Currently, much work is being done on cardiac conditions and necessary equipment for measuring the output of the heart has become a requirement and necessity. Hence, an instrument that measures small temperature changes is of great value in determining the ability of the heart to perform its function. By inserting the thermistor in the aorta the fluctuation in output may be measured by sensing temperature changes.

Therefore, it is an object of this invention to provide an improved temperature sensitive device usable as a cardiac output meter.

It is a further object of this invention to provide an improved cardiac output meter consisting of a double bridge circuit utilizing individual transistors in certain legs of the circuit to provide an extremely accurate and low voltage device for measuring the change in temperature measured by a sensing thermistor.

It is yet a further object of this invention to provide an improved temperature measuring device, comprising: an input circuit including; a thermistor sensing element, a variable resistor selectivity connectable in shunt with the thermistor, and means for biasing the thermistor; a first bridge circuit including; a first pair of resistors in one arm of the bridge circuit, a first transistor and a resistor in the other arm of the first bridge circuit, and means for biasing the first bridge circuit; a second bridge circuit including; a second pair of resistors in one arm of the second bridge circuit, a resistor and a second transistor in the other arm of the second bridge circuit, and means for biasing the second bridge circuit; an output circuit coupled between the second transistor and a common point between the second pair of resistors of the second bridge circuit; means connecting the second transistor to the first transistor; means connecting the second transistor to a common point between the first pair of resistors in the first bridge circuit; and means including a variable resistor coupled between the second transistor and the input circuit, for calibrating the measuring device.

Other objects, advantages and novel features of the invention will become apparent from the following detailed description of the invention when considered in conjunction with the accompanying drawings wherein:

The figure shows a circuit diagram of the double bridge circuit utilizing the invention.

The diagram is broken up by dashed lines to show the thermistor measuring element 10, a first bridge circuit 11, and a second bridge circuit 12 having an output coupled to a recording device, not shown, for measuring the variation of cardiac output.

A thermistor 14 is connected to a pair of leads through plugs 15, 16 to a switch element 17, and a calibration potentiometer 18. Bridge 11 includes, in one leg, resistors 19 and 20, and in the other leg resistor 21, and a transistor 22. The emitter 23 and collector 24 connect the transistor 22 in a standard bridge circuit configuration and are biased through switch 25 to battery 26. The base 27 is connected to switch 17 and a resistor 28. A resistor 29, having a movable contact 30, is connected by switch 31 to a battery 32 which biases the base 27 of transistor 22, and in addition provides for calibrating voltages and voltages for the proper operation of the thermistor 14.

Bridge 12 includes a first leg having resistors 40 and 41, and a second leg, including a resistor 42, and a second transistor 43 whose emitter 44 and collector 45 are connected in the bridge circuit. A switch 46 connects a battery 47, between the emitter 44 and the common point between resistors 41, 42 to provide the necessary biases for the transistor. An output circuit includes an output terminal 48, coupled between the common point of collector 45 and resistance 42 and the common point between resistors 40 and 41. In addition, the common point between resistors 40 and 41 is connected to ground 50 through lead 51. A capacitor 52 is provided in the output circuit as is a push button switch 53.

The connection between the two bridge circuits is provided by coupling the base 60 of transistor 43 to the common point between resistors 19 and 20 of bridge 11; and connecting the emitter 44 of transistor 43 through lead 61 to the collector 24 of transistor 22.

The coupling between the bridge 11 and the input circuit 10 is provided through the connection of base 27 of transistor 22 through a lead 70 coupled to the variable resistance 29 and through variable contact 30.

Generally, the circuit shown in the figure indicates that the second stage, or bridge 12, is a virtual duplicate of bridge 11, but interlocked in a way at the input so that the single balancing resistor 29 can balance the entire amplifier to a null at the output, so that a rise or fall in temperature can be recorded at full scale after amplification with linear response. Although specific values are set forth in this application it is to be understood that modifications and variations may be made without altering the invention.

The thermistor 14 in the input circuit 10 should be rated anywhere between 500 and 5000 ohms at 25 degrees centigrade to match the input bridge, and maintain the output balance (or null) and high gain. Whereas it is advisable that the bridge voltage not exceed 1.5 volts to minimize current through the thermistor, the voltage in the first bridge may be anywhere between 3.0 and 9.0 volts. An increase voltage supply in the second bridge circuit gives more gain and more total linear output voltage to the whole amplifier (by extra gain in the second stage). However, a heat sink should be used if more than 3.0 volts as used, not because of heating, but because of shifts in heat loss from the transistor case.

This considerably unorthodox circuit for DC amplifier works on the principal of change in apparent resistance between the collector and the emitter of a PNP transistor when a current flows between the base and emitter in a grounded emitter circuit. It is constructed so that electrons always flow between the base and emitter, thus giving the collector-emitter a stable and known single resistance that balances the 4 arms of the bridge circuits.

Any increase or decrease of base-emitter electron flow will unbalance the bridge and can effect the next stage or bridge. It has a high efficiency because of a change at the input gives voltage gain (bridge inbalance) and current gain (classic characteristics of transistors). The output range is plus or minus 2 volts, linear to less than .1% error with a 9 volt battery in the second bridge circuit.

In one successful embodiment of this invention, when used as a preamplifier into a commercial oscillograph recorder utilizing a high grade thermistor, this circuitry will provide measurements of temperature with changes as small as plus or minus 0.0001 degree centigrade within reading error of the eye on the chart. This provides somewhat of a problem in calibration which was solved by first calibrating the attenuator using a mercury cell and a ten turn potentiometer, and a millivolt-microvolt divider.

Suggested values of components for a successful embodiment of the invention are as follows:

| Number: | Component | Value or type |
|---|---|---|
| 14 | Thermister | 500 to 5,000 ohms at 25° C. |
| 22 | Transistor | 2N 2614 PNP. |
| 43 | Transistor | 2N 2614 PNP. |
| 18 | Resistor | 0 to 5,000 ohms. |
| 19 | do | 2,200 ohms. |
| 20 | do | Do. |
| 21 | do | 27,000 ohms. |
| 28 | do | 1,500 ohms. |
| 29 | do | 0 to 1,000 ohms. |
| 40 | do | 10,000 ohms. |
| 41 | do | Do. |
| 42 | do | Do. |
| 26 | Battery | 1.5 volts. |
| 32 | do | Do. |
| 47 | do | 3 to 9 volts. |

Obviously many modifications and variations of the present invention are possible in the light of the above teachings. It is therefore to be understood that the invention may be practiced otherwise than as specifically described.

I claim:
1. An improved temperature measuring device, comprising:
  (a) an input circuit including:
    (1) a thermistor sensing element,
    (2) a variable resistor connectable in place of said thermistor for calibration and balancing of said input circuit,
    (3) first bias means connected across said thermistor for biasing said thermistor;
  (b) a first bridge circuit including:
    (1) a first pair of resistors connected in a first series circuit to form first and second arms of said first bridge circuit,
    (2) a first transistor having a base, an emitter, a collector and a resistor connected in a second series circuit to form third and fourth arms of said first bridge circuit, said first and second series circuits connected in a first parallel circuit to form said bridge circuit,
    (3) second bias means connected across said first parallel circuit for biasing said first bridge circuit; said input circuit connected between said base and emitter of said first transistors;
  (c) a second bridge circuit including:
    (1) a second pair of resistors connected in a third series circuit to form first and second arms of said second bridge circuit,
    (2) a resistor and a second transistor having a base, an emitter and a collector connected in a fourth series circuit to form third and fourth arms, said third and fourth series circuits connected in a second parallel circuit to form said second bridge circuit,
    (3) third bias means connected across said second parallel circuit for biasing said second bridge circuit;
  (d) an output circuit coupled between a first terminal of said second transistor and a common point between said second pair of resistors of said second bridge circuit;
  (e) means connecting a second terminal of said second transistor to said first transistor;
  (f) means connecting a third terminal of said second transistor to a common point between said first pair of resistors in said first bridge circuit; and
  (g) means including a variable resistor coupled between said second transistor and said input circuit, for calibrating said measuring device.

2. The device of claim 1 wherein said second and third bias means for biasing said first and second bridge circuits, bias said first and second transistors in a forward biased condition.

3. The device of claim 2 wherein said output circuit is coupled between the collector of said second transistor and the common point between said second pair of resistors.

4. The device of claim 3 wherein said means connecting said second transistor to said first transistor connects the collector of said second transistor to the emitter of said first transistor.

5. The device of claim 4 wherein the connecting means between said second transistor and said first pair of resistors is coupled to the base of said second transistor.

6. The device of claim 5 wherein the means for calibrating said measuring device is coupled between the base of said second transistor and the input circuit.

7. The device of claim 6 wherein said output circuit includes a test point, a capacitor, and a push button, said items being connected in parallel between the collector of said second transistor and the common point of said second pair of resistors.

8. The device of claim 7 wherein the common point of said second pair of resistors is connected to ground potential.

References Cited

UNITED STATES PATENTS 3,106,645 10/1963 Kaufman.
3,348,415 10/1967 Ash.
3,360,715 12/1967 Mueller.
3,367,186 2/1968 Ensign et al.

LOUIS R. PRINCE, Primary Examiner
FREDERICK SHOON, Assistant Examiner

U.S. Cl. X.R.
323—75